United States Patent [19]
Smith

[11] Patent Number: 5,915,909
[45] Date of Patent: Jun. 29, 1999

[54] AUTOMATIC VERTICAL STORAGE AND RETRIEVAL SYSTEM

[75] Inventor: Jak L. Smith, Parkersburg, W. Va.

[73] Assignee: Kardex Systems, Inc., Marietta, Ohio

[21] Appl. No.: 08/971,370

[22] Filed: Nov. 17, 1997

[51] Int. Cl.⁶ .................................................. B65G 1/04
[52] U.S. Cl. ........................ 414/280; 414/273; 187/360
[58] Field of Search ................................ 414/273, 276, 414/277, 278, 279, 280, 281, 282, 283, 284, 285, 286; 187/360, 367, 370, 374; 901/49

[56] References Cited

U.S. PATENT DOCUMENTS

| | | | |
|---|---|---|---|
| 3,252,547 | 5/1966 | Homedo | 187/360 X |
| 4,010,856 | 3/1977 | Anderson | 414/280 X |
| 4,113,119 | 9/1978 | Brown et al. | 187/360 X |
| 5,213,463 | 5/1993 | Rothlisberger et al. | 414/280 |
| 5,228,537 | 7/1993 | Pfleger et al. | 187/360 X |
| 5,411,117 | 5/1995 | Häyrinen | 187/360 |
| 5,544,996 | 8/1996 | Castaldi et al. | 414/280 |
| 5,791,852 | 8/1998 | Bibby et al. | 414/280 X |
| 5,810,540 | 9/1998 | Castaldi | 414/280 |

*Primary Examiner*—Frank E. Werner
*Attorney, Agent, or Firm*—Kane,Dalsimer,Sullivan,Kurucz, Levy, Eisele and Richard, LLP

[57] ABSTRACT

The automatic vertical storage and retrieval system has an extractor for retrieving items stored and presenting the retrieved items to an operator. The extractor is vertically displaceable between and along vertical rails and is driven by an electromechanical chain drive system. The rails have equally-spaced locking slots for attaching pan brackets to form storage platforms for storage pans. The extractor includes an extractor stabilization mechanism having four locking dogs which engage with the locking slots of the rails to support the extractor and any retrieved items, thereby removing the load on the chains of the chain drive system during extraction or deposition of the storage pan(s). Thus, the extractor can be located in the optimal vertical position without the use of a precision linear encoder, and the extractor can maintain this optimal vertical position as the load is transferred to or from the extractor.

9 Claims, 7 Drawing Sheets

AUTOMATIC VERTICAL STORAGE AND RETRIEVAL SYSTEM

BACKGROUND OF THE INVENTION

1. Field of the Invention

This invention pertains to an automatic vertical storage and retrieval system and, more particularly, to a system having an extractor mechanism which is vertically stable and insensitive to changes in loading by means of one or more locking dogs.

2. Description of the Prior Art

Automatic vertical storage and retrieval systems are used to store various items in a vertical columnar array of storage platforms. Extractor mechanisms have been used in automatic vertical storage and retrieval systems such as in U.S. Pat. No. 5,544,996 for "Automated Storage and Retrieval System." These extractors allow items to be stored to and retrieved from the storage platforms.

Extractors of automatic vertical storage and retrieval systems typically travel vertically along and between the storage arrays by means of a chain or cable system driven by an electric motor. Optical encoders or similar means are used in automatic vertical storage and retrieval systems to position the extractor along the vertical array. An automatic vertical storage and retrieval system which uses an optical encoder at the motor to position the extractor must be periodically calibrated to account for drift in the calibration. The chain or cable drive system operates not only to drive and position the extractor mechanism but also to support the extractor mechanism while retrieving stored items or presenting retrieved items to the operator.

The chain or cable drive system in a typical automatic vertical storage and retrieval system may consist of a pair of chains or cables. One end of the each chain or cable is attached to opposite sides of the extractor, and the other end of each chain or cable is provided with a counterweight. The counterweight is used to compensate for the weight of the payload and to ease the strain on the motor drive during vertical displacement of the extractor. However, the extractor is vertically displaced in both a laden and an unladen condition and each payload differs in weight. Therefor, the effectiveness of counterweights in known automatic vertical storage and retrieval systems is limited. A payload weight of 500 pounds or more is not untypical in automatic vertical storage and retrieval systems. Because of the weight of such payloads, a danger of chain or cable breakage exists in known vertical storage and retrieval systems. Even if the chain or cable does not break, any stretching of the chain, cable or support members, even if slight, could cause a misalignment problem.

Therefore, in order to alleviate these problems, an objective of the present invention is to provide an automatic vertical storage and retrieval system with an extractor mechanism which is vertically stable at all four corners. Another objective of the present invention is to provide an automatic vertical storage and retrieval system with a positive positioning system which does not rely on an optical encoder to maintain precise vertical positioning or for final vertical positioning. Another objective of the present invention is to provide an automatic vertical storage and retrieval system with an extractor mechanism which is supported by one or more locking dogs during retrieval of stored items and presentation of retrieved items to the operator, thereby causing the extractor to maintain a horizontal attitude regardless of uneven or off-center loading. Yet another objective of the present invention is to provide an automatic vertical storage and retrieval system with an extractor mechanism which is supported by the locking dogs whenever the extractor is in a rest position to increase safety toward person's servicing, operating and maintaining the vertical storage and retrieval system.

SUMMARY OF THE INVENTION

The above and other beneficial objects are obtained in accordance with the present invention by providing an automatic vertical storage and retrieval system with an extractor mechanism which is vertically stable and insensitive to uneven or off-center loading. An extractor is vertically displaceable along and between a vertical array of storage platforms by means of an electromechanical drive system. The electromechanical drive system includes a cable or chain attached to each of the four corners of the extractor. The extractor can slide or be guided by rollers along and between a plurality of vertical support members. The vertical support members have a plurality of equally-spaced locking slots. The extractor includes a plurality of locking dogs for engaging with the locking slots of the support members thereby supporting and leveling the extractor mechanism during retrieval of items from the storage platforms and during presentation of the retrieved items to the operator. The locking slots also provide precise positioning of the extractor in relation to the storage platforms without the need for a precision optical encoder and precision motor drive system.

DETAILED DESCRIPTION OF THE PREFERRED EMBODIMENTS

The aforementioned figures illustrate an automatic vertical storage and retrieval system 10 where identical numerals in each figure represent identical elements.

Figure 1:
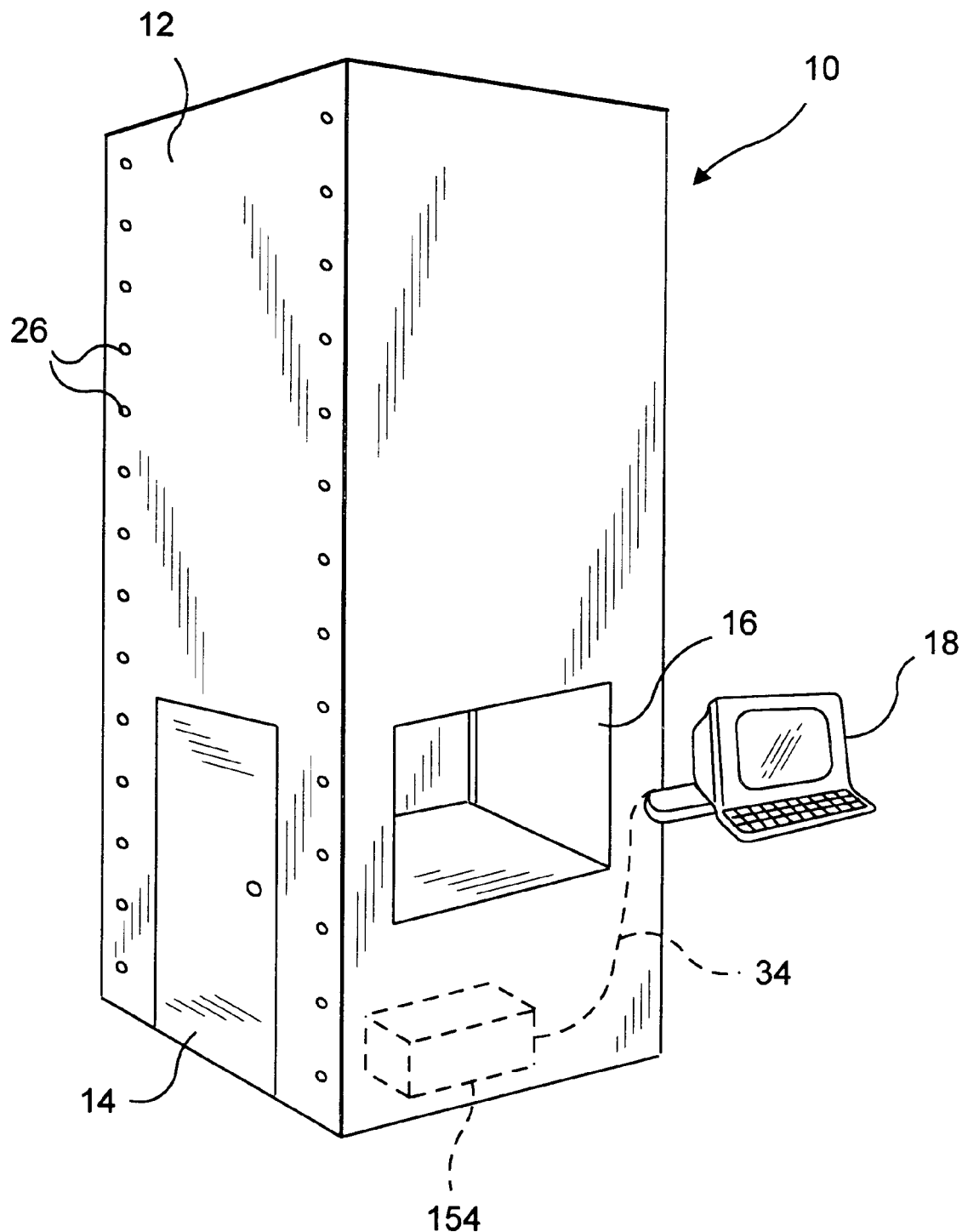
FIG. 1 is a front perspective view of an automatic vertical storage and retrieval system.

As illustrated in FIG. 1, the automatic vertical storage and retrieval system 10 is encased by skin 12. Skin 12 can be made of any material, such as sheet metal, which will sufficiently enclose the automatic vertical storage and retrieval system 10, protect items stored within the automatic vertical storage and retrieval system 10 and protect personnel from the internal mechanics of the automatic vertical storage and retrieval system 10. Skin 12 is not intended to be a structural member of the automatic vertical storage and retrieval system 10. A service door 14 is provided to allow access to repair and maintain the automatic storage and retrieval system 10. Access window 16 is provided to permit an operator to retrieve items from the automatic vertical storage and retrieval system 10. Control system 18 operates as an interface between the operator and the automatic vertical storage and retrieval system 10, operation of the automatic vertical storage and retrieval system 10 being commanded by electronics chassis 154 as described below.

Figure 2:
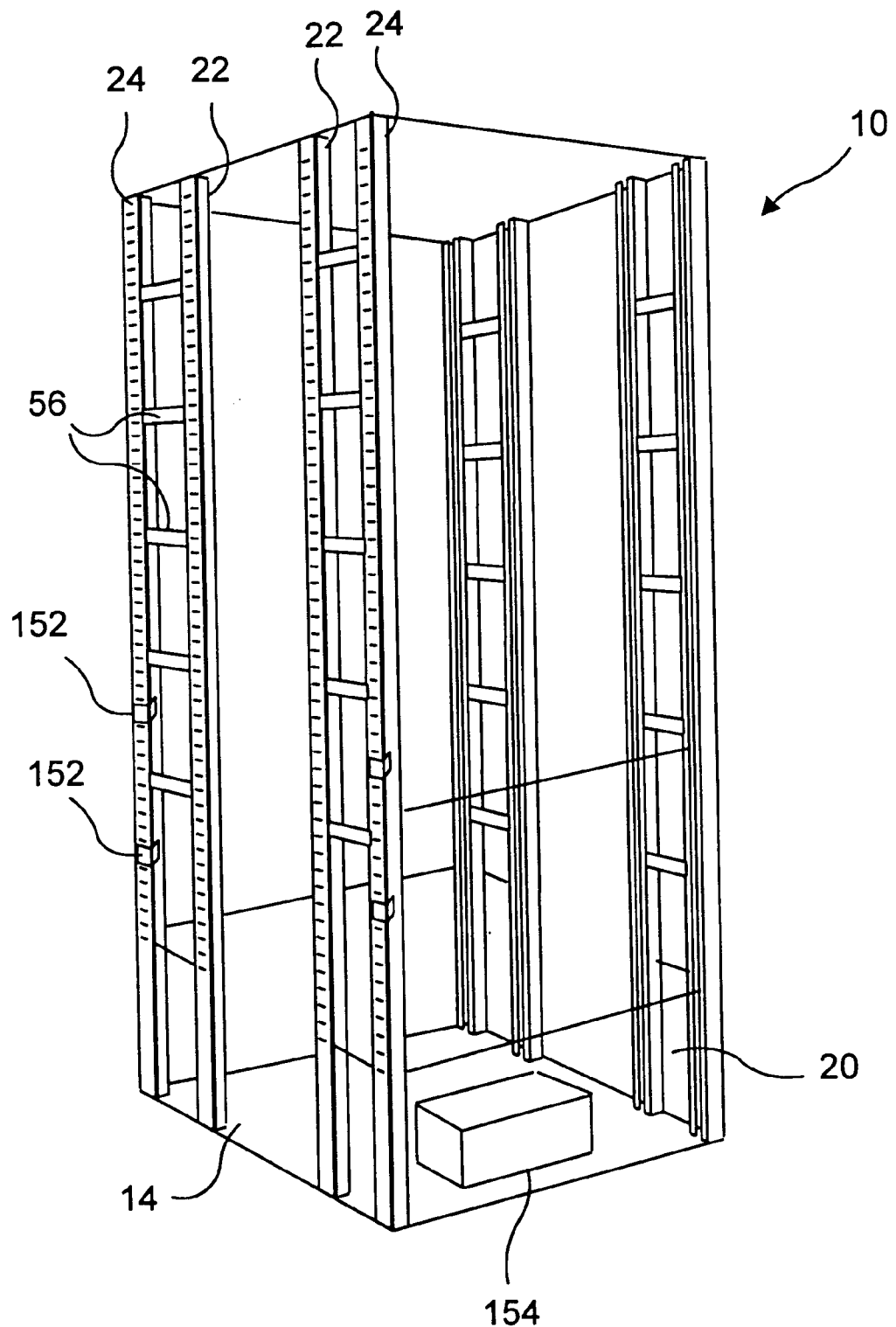
FIG. 2 is a front perspective view of the automatic vertical storage and retrieval system with the outer skin removed.

As illustrated in FIG. 2, automatic vertical storage and retrieval system 10 includes a base 20 which allows the automatic vertical storage and retrieval system 10 to be a free-standing system without the need for grouting or permanent mounting to the floor. Inner rails 22 and outer rails 24 are vertically disposed with respect to the base 20 and form the structural members of the automatic vertical storage and retrieval system 10. Inner rails 22 and outer rails 24 have a substantially C-shaped cross-section, where each side is perpendicular to each adjacent side. Skin 12 is mounted to the inner rails 22 and/or outer rails 24 by skin brackets 152 and screws 26. Each of the inner rails 22 and outer rails 24 has a plurality of equally-spaced locking slots 28 along the length of each side. Locking slots 28 are preferably spaced on one-inch centers.

Figure 3:
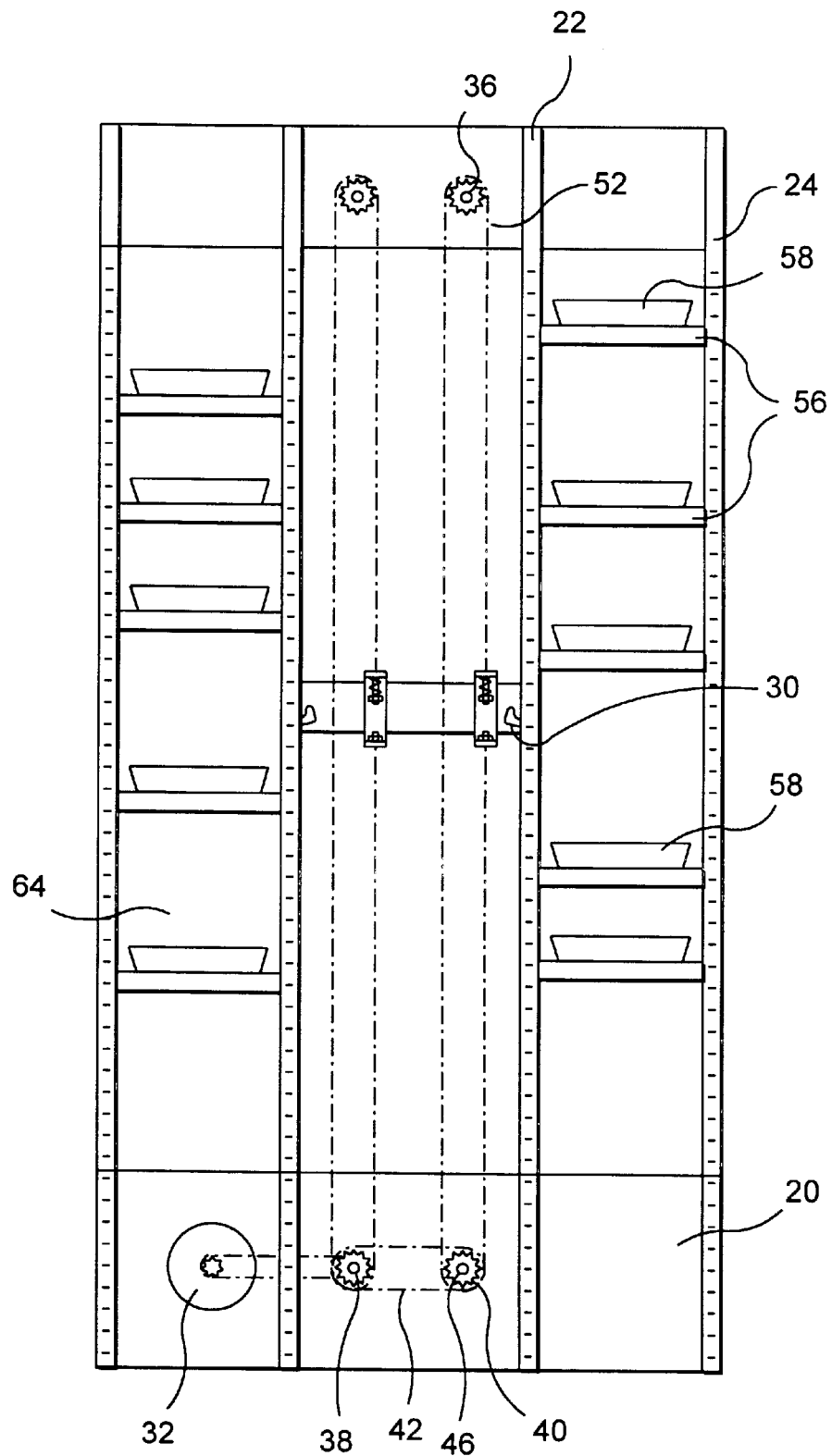
FIG. 3 is a side elevational view of the automatic vertical storage and retrieval system.

As illustrated in FIG. 3, a drive motor 32 is mounted in the base 20 of the automatic vertical storage and retrieval system 10. Drive motor 32 is preferably an electric motor driven by alternating current. Drive motor 32 is controlled by electronics chassis 154 as commanded by control system 18 through control signal wire 34. At each end of main drive shaft 38 and drive shaft 46 is a chain drive sprocket 40 for respectively engaging with one of the two main drive chains 42. Main drive chains 42 engage with sprockets 40 such that the rotation of main drive shaft 38, through main drive chains 42, causes rotation of drive shaft 46.

A chain drive sprocket 50 is located at each end of main drive shaft 38 and drive shaft 46. Drive motor 32 causes rotation of main drive shaft 38, drive shafts 46 and chain drive sprockets 50. Through chains 52, the rotation of chain drive sprockets 50 causes vertical displacement of extractor 30 along and between inner rails 22. Idler sprockets 36 are provided at the top of automatic vertical storage and retrieval system 10 and permit the tension of chains 52 to be adjusted. Each chain 52 forms a continuous loop, thus eliminating the need for a counterweight.

Figure 5:
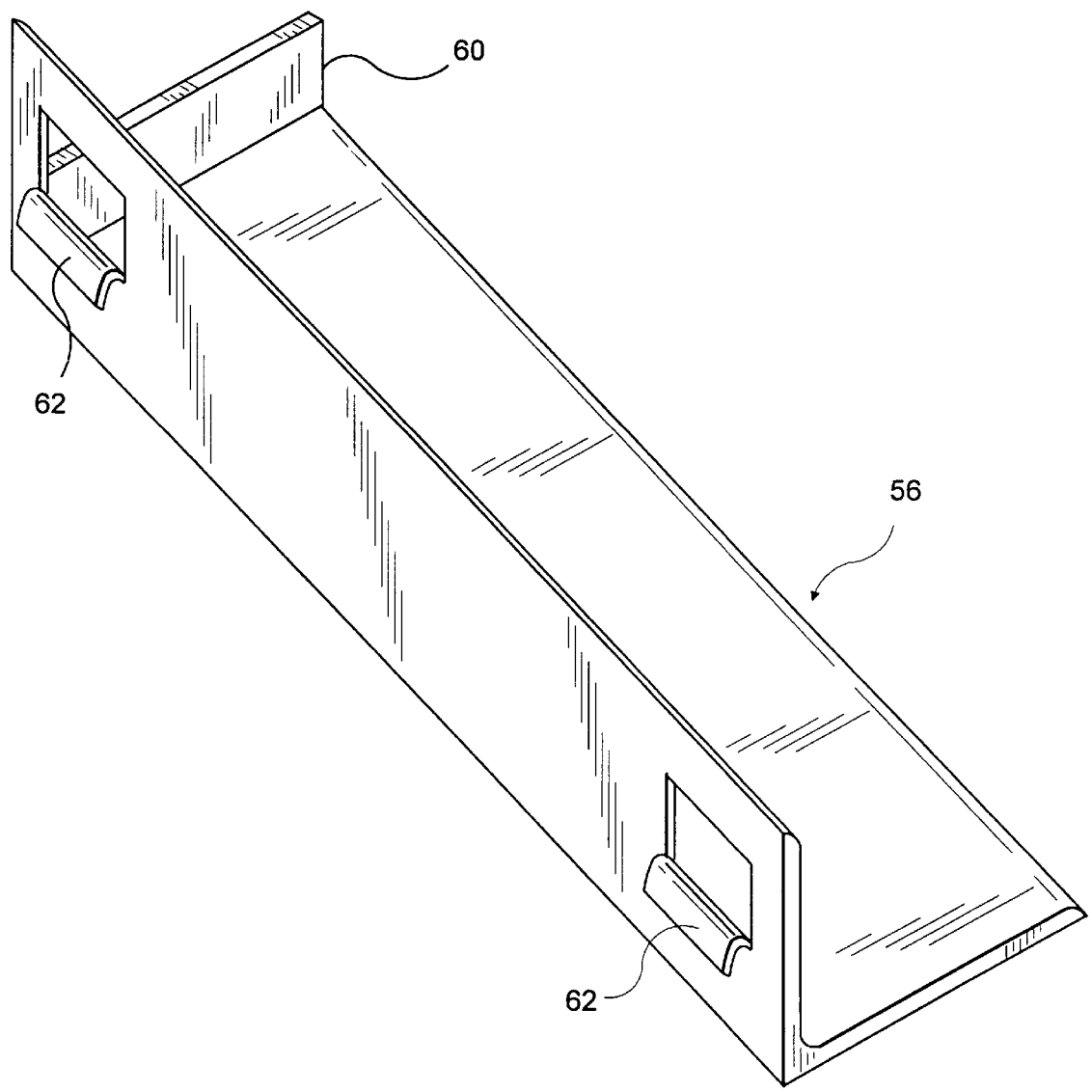
FIG. 5 is a front perspective view of a pan bracket of the automatic vertical storage and retrieval system.

A plurality of storage pan support brackets 56 are provided to support storage pans 58. As illustrated in FIG. 5, storage pan support brackets 56 preferably have an L-shaped cross section with a back stop 60 to provide a positive stop position for storage pan 58. Each storage pan support bracket 56 includes a clip 62 at each end. Clips 62 are insertable into locking slots 28 of inner rails 22 and outer rails 24. Alternatively, storage pan support brackets 56 may be bolted to inner rails 22 and outer rails 24. Storage pan support brackets 56 are horizontally disposed with respect to the floor. When installed in pairs, storage pan support brackets 56 create a storage platform 64 for storage pans 58 such that storage pans 58 maintain a horizontal position with respect to the floor.

Figure 4:
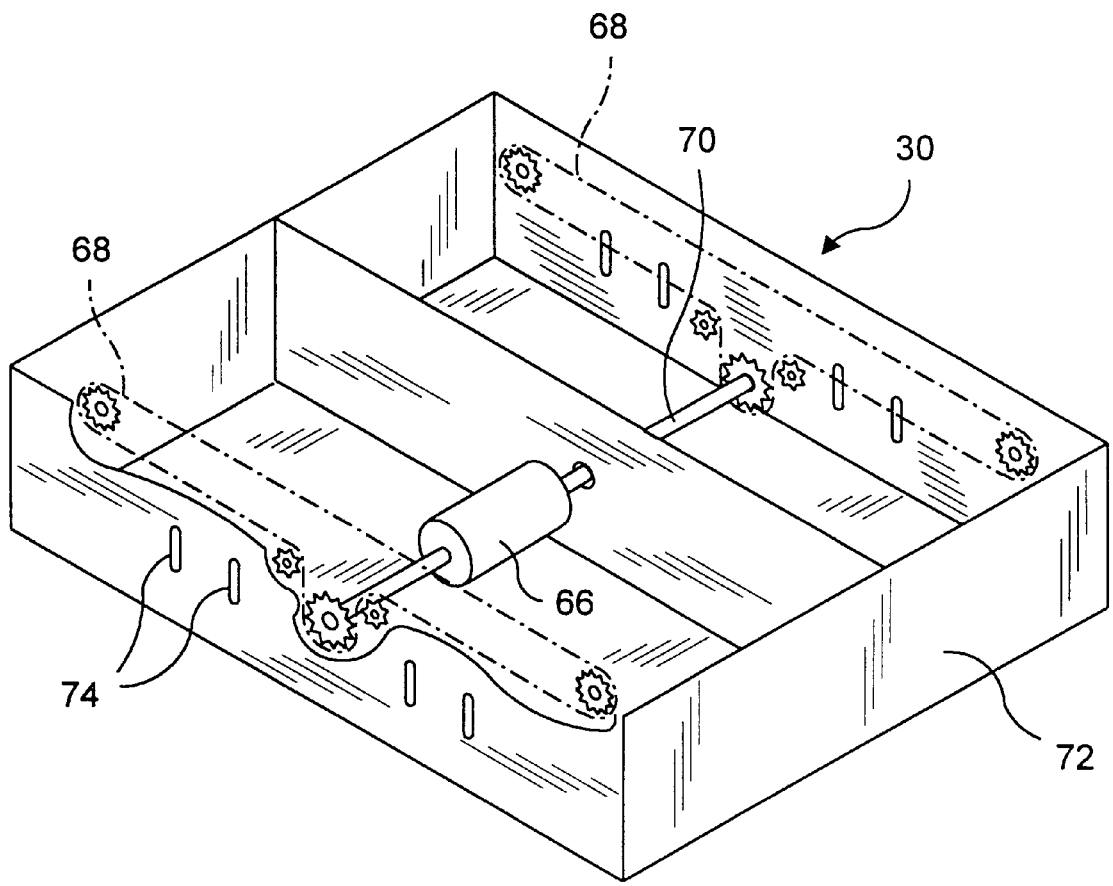
FIG. 4 is a front perspective view of an extractor of the automatic vertical storage and retrieval system.

An extractor 30 is vertically displaceable along and between inner rails 22. Extractor 30 may be slidable along and between inner rails 22, or extractor 30 may include rollers to guide extractor 30 along inner rails 22 and to reduce wear on extractor 30 and inner rails 22. As illustrated in FIG. 4, extractor 30 includes a drive motor 66 for driving extractor chains 68 through shaft 70. Extractor chains 68 operate to slidably retrieve storage pan 58 from the storage platform 64. Enclosure 72 has slotted holes 74 for engaging sliding bracket 156 to support extractor 30 on chains 52. Cover, not shown, engages with side frame 82 to encase and protect drive motor 66, extractor chains 68, shaft 70 and other components contained within the extractor 30. Drive motor 66 is controlled by control system 18 and electronics chassis 154 though extractor control cable 78.

Figure 7:
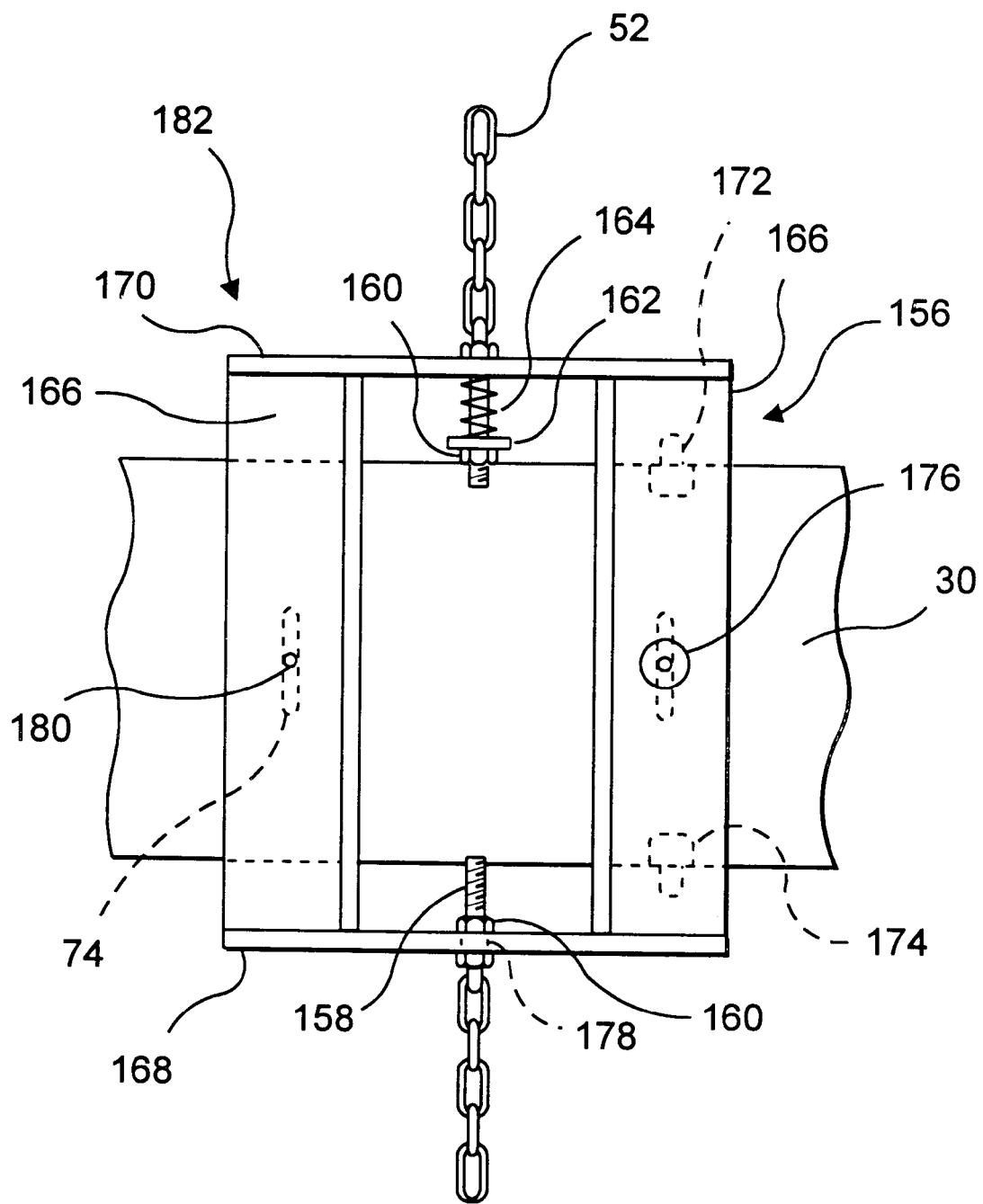
FIG. 7 is a front elevation view of a floating support system for the extractor of the automatic vertical storage and retrieval system.

As illustrated in FIG. 7, extractor 30 is supported on chains 52 by a floating support system 182. Sliding bracket 156 has a bottom plate 168, a top plate 170 and two side plates 166. Top plate 170 is substantially parallel to bottom plate 168, and top plate 170 and bottom plate 168 are substantially perpendicular to side plates 166. Each end of each of the chains 52 has a threaded end 158. Top plate 170 and bottom plate 168 have a holes 178 for receiving threaded ends 158. Threaded end 158 is inserted through hole 178 of bottom plate 168, and nut 160 is threaded onto threaded end 158 to secure chain 52 to bottom plate 168. Chain 52 is secured to top plate 170 by spring 164, backup washer 162 and nut 160. Threaded end 158 of chain 52 is inserted through hole 178 of top plate 170, through spring 164 and backup washer 162. Nut 160 is threaded onto threaded end 158 to secure top plate 170 to chain 52. Spring 164 compensates for uneven loading conditions and operates as a shock absorber.

Each side plate 166 has a hole 180 preferably located centrally along the length of side plate 166. Retaining pins 176 are insertable through holes 180 and through slotted holes 74 to attach sliding bracket 156 to extractor 30, thereby attaching extractor 30 to chains 52. Thus, the floating support system 182 permits the chain driven sliding brackets 156 to completely disengage from the extractor 30 after final positioning has occurred and the drive motor 32 has stopped as will be more fully described below. At least one lift sensor 174 is located at the bottom of and within extractor 30, with an activator portion protruding through the bottom of extractor 30. At least a portion of at least one bottom plate 168 extends under the bottom surface of extractor 30 and is located directly below the activator portion of lift sensor 174. Preferable, extractor 30 includes four lift sensors 174 located at each attachment point of chains 52. At least one overtravel switch 172 is located at the top of and within extractor 30, with an activator portion protruding through the top surface of extractor 30. At least a portion of at least one top plate 170 extends over the top surface of extractor 30 and is located directly above the activator portion of overtravel switch 172. Preferably, extractor 30 includes four overtravel switches 172 located at each attachment point of chains 52. Lift sensors 174 and overtravel switches 172 transmit signals to electronics chassis 154 through control cable 78.

Figure 6:
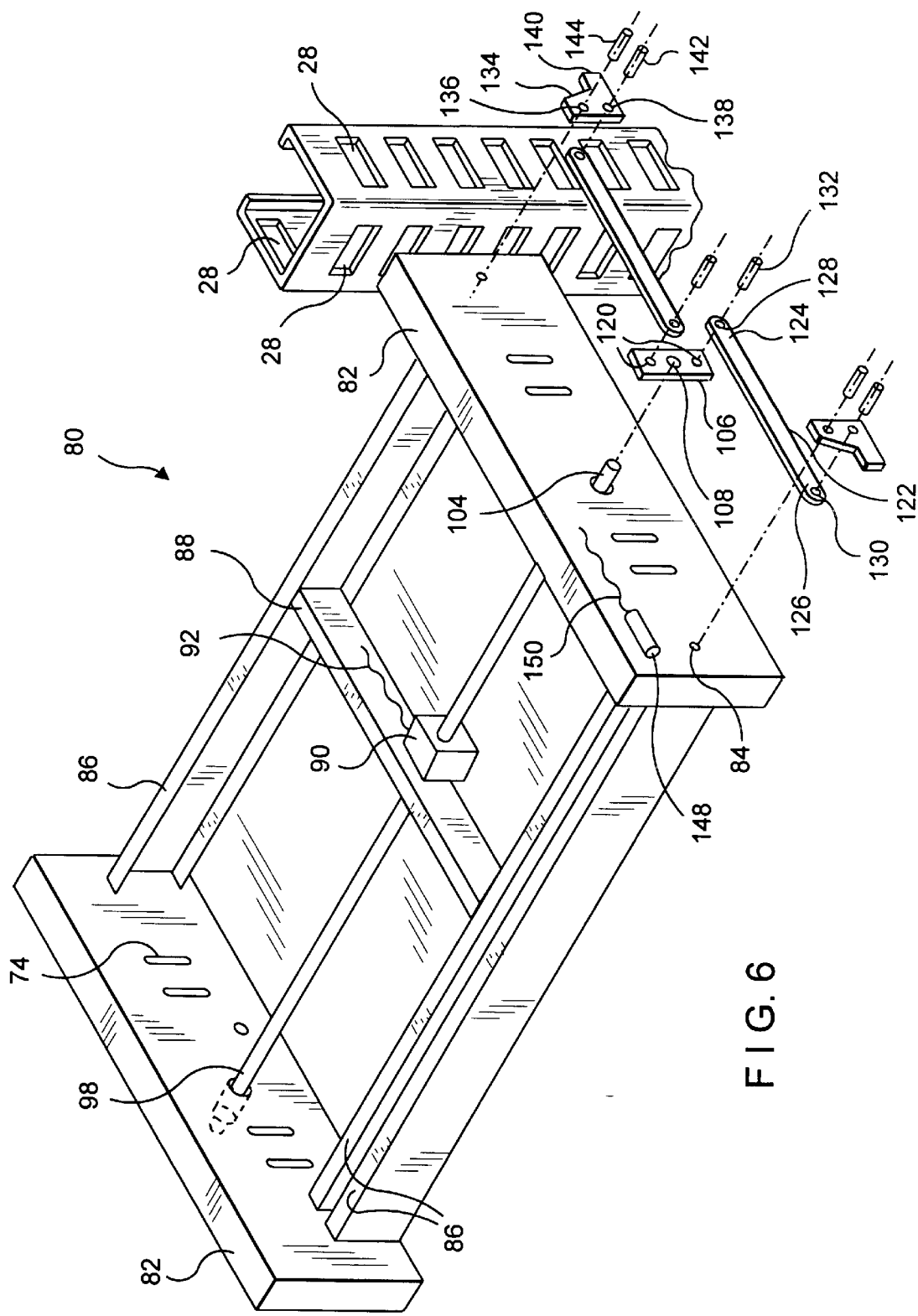
FIG. 6 is an exploded view of an extractor stabilization mechanism of the automatic vertical storage and retrieval system.

Extractor 30 includes an extractor stabilization mechanism 80 as illustrated in FIG. 6. Extractor stabilization mechanism 80 is comprised of two side frame members 82, three lateral frame members 86 and cross frame member 88. Side frame members 82 and lateral frame members 86 form a rectangular extractor frame. Cross frame member 88 is centrally positioned along lateral frame members 86 and parallel to side frame members 82. Cross frame member 88 provides lateral stability to the extractor frame. Actuator 90 is centrally positioned along cross frame member 88. Actuator 90 is controlled by electronics chassis 154 and receives control signals from electronics chassis 154 through actuator control cable 92.

Actuator 90 is preferably an servo motor and operates to rotate shaft 98. Alternatively, actuator 90 may be a solenoid. Shaft 98 has ends 104. Mounted on each end 104 of shaft 98 is block 106. Block 106 has a hole 108 which is centrally located. Ends 104 of shaft 98 are insertable into hole 108 such that block 106 rotates with the rotation of shaft 98. Shaft 98 may be frictionally insertable into hole 108. Alternatively, ends 104 of shaft 98 may have external splines to mesh with internal splines of hole 108 of block 106. Alternatively, ends 104 of shaft 98 may have a recess such that a set screw, when threaded into an internally threaded set screw bore, prevents the rotation of block 106 with respect to shaft 98.

Block 106 also has holes 120 axially aligned with hole 108. Actuator bar 122 has an end 124 and an end 126. End 124 has a hole 128, and end 126 has a hole 130. When hole 120 and hole 128 are aligned, plug 132 is inserted through holes 120 and 128 and, thus, connects block 106 to actuator bar 122. Plug 132 can be of any design to allow actuator bar 122 to rotate around plug 132 when plug 132 has been inserted through holes 120 and 128. Plug 132 allows the actuator bar 122 to have one axis of rotation.

Locking dogs 134 have hole 136, hole 138 and leg 140. When inserted through hole 138 and hole 130, plug 142 connects actuator bar 122 to locking dog 134 and allows rotation of actuator bar 122 with relative to locking dog 134 along one axis of rotation. When inserted through hole 136 and hole 84, plug 144 connects locking dog 134 to side frame member 82 and allows for rotation of locking dog 134 with respect to side frame member 82. Actuator 90 and locking dogs 134 are preferably interconnected by an intermediary spring-loading mechanism. Actuator 90 need only impart a sufficient force on locking dogs 134 to rotate the locking dogs 134 about plug 144. Thus, actuator 90 should operate to bias locking dogs 134 into or out of locking slots 28 without excessive force. By spring-loading the locking dogs 134, burn-out of actuator 90 and excess wear on leg 140 and inner rails 22 is thereby prevented.

In order to raise or lower extractor 30 from a rest position, extractor 30 must be raised slightly in order to retract the locking dogs 134 from the locking slots 28. When extractor 30 is in a rest position, leg 140 extends into locking slot 28 thereby supporting extractor 30 and any items retrieved from storage platform 64. When drive motor 32 receives a signal from electronics chassis 154 to raise or to lower extractor 30, actuator 90 synchronously receives a signal from electronics chassis 154 to retract locking dogs 134. Torque generated by actuator 90 is transmitted to shaft 98. However, rotation of locking dogs 134 about plug 144 is prevented due to friction between leg 140 and locking slot 28. As torque is generated by drive motor 32, chains 52 impart a lifting force on sliding brackets 156. As sliding brackets 156 are lifted by chains 52, sliding brackets 156 are begin vertically displacement with respect to extractor 30. As the sliding brackets 156 begin to lift extractor 30, the activator portion of lift sensor 174 protruding from the under surface of extractor 30 is depressed causing lift sensor 174 to transmit a signal to electronics chassis 154 of the lifting of extractor 30 and any payload contained thereon. Once sufficient torque is generate by drive motor 32, the force of gravity on extractor 30 is balanced by the lifting force imparted by chains 52. Thus, the friction between leg 140 and locking slot 28 is removed, allowing shaft 98 to rotate. The rotation of actuator shaft 94 causes rotation of shaft 98, and, therefore, blocks 106, through actuator gear 96 and gear 100. Rotation of blocks 106 causes rotation of locking dogs 134 about plug 144 through actuator bars 122, thereby retracting legs 140 from locking slots 28. Once legs 140 are retracted from locking slots 28, extractor 30 may be raised or lowered in accordance with control signals received from electronics chassis 154.

Extractor 30 must approach a desired stopping position, that is a vertical position in which to retrieve a storage pan 58 from a storage platform 64 or to present retrieved items to the operator at access window 16, from above because the weight of the extractor 30 and any payload carried thereon will be supported by the legs 140 of locking dogs 134. As extractor 30 approaches a desired stopping position, electronics chassis 154 transmits a signal to drive motor 32 to slow the vertical movement of extractor 30. Electronics chassis 154 then transmits a signal to actuator 90 to extend legs 140 of locking dogs 134. Because legs 140 are not in vertical alignment with locking slots 28, legs 140 can not be fully extended. As extractor 30 further approaches the desired stopping position, legs 140 become vertically aligned with locking slots 28, allowing legs 140 to fully extend into locking slots 28. Extractor 30 continues its descent into the desired stopping position until such time as the weight of the extractor 30 and any items carried thereon is fully supported by the legs 140 of locking dogs 134. Once the sliding brackets 156 have continued downward such that the activator portion of lift sensor 174 is no longer depressed, electronics chassis 154 receives a signal from lift sensor 174 that the extractor 30 has reached its rest position and that the weight of the extractor 30 and any payload carried thereon is no longer being carried by chains 52. Electronics chassis 154 then transmits a signal to drive motor 32 to cease operation. The protruding portion of overtravel switch 172 is depressed, transmitting a signal of overtravel to electronics chassis 154, if sliding brackets 156 continue descending. That is if drive motor 32 does not cease in accordance with the control signals transmitted by electronics chassis 154, overtravel switch 172 functions as a safety mechanism and to alert the operator of a malfunction of automatic vertical storage and retrieval system 10. It will be appreciated that the design and selection of the logic circuitry of electronics chassis 154, lift sensors 174 and overtravel switches 172 would permit additional control or data acquisition by electronics chassis 154 of, for example, payload weight.

Two sensors 148 are mounted on one of the side frame members 82. Sensors 148 are connected to electronics chassis 154 through wire 150. Sensors 148 are preferably a proximity sensors. Alternatively, sensors 148 may be optical sensors. Sensors 148 operates during vertical displacement of extractor 30 and transmits a signal to the control system 18 for each locking slot 28 traversed by the extractor 30. Because locking slots 28 are equally spaced along the length of the rails 22, 24, sensors 148 essentially operate as counters, thereby allowing electronics chassis 154 to accurately position the extractor 30. By using quadrature techniques, sensors 148 may be used by electronics chassis 154 to determine the direction of travel of extractor 30.

Thus, the several aforementioned objects and advantages are most effectively attained. Although a single preferred embodiment of the invention has been disclosed and described in detail herein, it should be understood that this invention is in no sense limited thereby and its scope is to be determined by that of the appended claims.

I claim:

1. An automatic vertical storage and retrieval system, comprising:

a base;

a plurality of rails vertically disposed with respect to said base, said rails having a first plurality of equally-spaced locking slots along a first surface;

a plurality of pan brackets disposed along said rails, a pair of said pan brackets forming a storage platform;

an extractor vertically displaceable between and along said rails, said extractor selectively extracting a storage pan from said storage platform;

a means for raising and lowering said extractor;

a means for vertically positioning said extractor; and a means for controlling said raising and lowering means, said extractor and said vertical positioning means;

wherein said extractor includes an extractor stabilization mechanism comprising a plurality of locking dogs and a means for selectively engaging said locking dogs into said first plurality of locking slots to support said extractor when said extractor is in a rest position, said locking dogs being retracted from said first plurality of locking slots by said engaging means when said extractor is being raised or lowered by said raising and lowering means, and wherein said controlling means controls said engaging means.

2. The automatic vertical storage and retrieval systems according to claim 1, wherein said vertical positioning means includes a sensor for locating said first plurality of locking slots, said controlling means determining a vertical position of said extractor based on said first plurality of locking slots located by said vertical positioning means.

3. The automatic vertical storage and retrieval system according to claim 2, wherein said controlling means transmits a signal to said raising and lowering means to raise said extractor from a rest position, said controlling means simultaneously transmitting a signal to said engaging means to retract said locking dogs from said first plurality of locking slots, said locking dogs being frictionally prevented from retracting from said first plurality of locking slots until said extractor is slightly raised from said rest position, said control system transmitting a signal after said locking dogs have been retracted from said first plurality of locking slots to said raising and lowering means to raise or lower said extractor in accordance with instructions entered by an operator into said control system;

and wherein said controlling means transmits a signal to said raising and lowering means to stop said extractor at a predetermined vertical rest position, said raising and lowering means approaching said predetermined vertical rest position from a vertical position above said predetermined vertical rest position, said controlling means transmitting a signal to said engaging means to extend said locking dogs into said first plurality of locking slots, said locking dogs being prevented from entering said first plurality of locking slots until said locking dogs are in alignment with said locking slots, said controlling means transmitting a signal to said raising and lowering means to cease vertical displacement of said extractor when said locking dogs are extended into said first plurality of locking slots and said extractor is supported by said locking dogs.

4. The automatic vertical storage and retrieval system according to claim 3, wherein said raising and lowering means includes an electric motor driving four sprockets, each of said sprockets driving a chain for raising and lowering said extractor.

5. The automatic vertical storage and retrieval system according to claim 4, further comprising four sliding brackets, each of said sliding brackets slidably attached to said extractor, a first end of each of said chains being attached to a bottom of each of said sliding brackets and a second end of each of said chains being springingly attached to a top of each of said sliding brackets.

6. The automatic vertical storage and retrieval system according to claim 5, wherein said engaging means includes an engaging motor for selectively engaging said locking dogs.

7. The automatic vertical storage and retrieval system according to claim 6, wherein said rails have a second plurality of equally-spaced locking slots along a second surface, said second surface being substantially perpendicular to said first surface, said pan brackets including a means for attaching said pan brackets to said second plurality of equally-spaced locking slots.

8. The automatic vertical storage and retrieval system according to claim 7, further comprising a skin, wherein said rails have a third plurality of equally-spaced locking slots along a third surface, said third surface being substantially perpendicular to said first surface and opposing said second surface, and wherein said skin encases said vertical storage and retrieval system when attached to said third plurality of locking slots.

9. The automatic vertical storage and retrieval systems according to claim 8, wherein said first plurality of locking slots, said second plurality of locking slots and said third plurality of locking slots are horizontally aligned.

* * * * *